United States Patent [19]
Bleske et al.

[11] Patent Number: 5,786,575
[45] Date of Patent: Jul. 28, 1998

[54] WRAP TOOL FOR MAGNETIC FIELD-RESPONSIVE HEAT-FUSIBLE PIPE COUPLINGS

[75] Inventors: Randy J. Bleske, San Jose; Joel D. Finegan, Fremont, both of Calif.

[73] Assignee: Gas Research Institute, Chicago, Ill.

[21] Appl. No.: 575,214

[22] Filed: Dec. 20, 1995

[51] Int. Cl.$^6$ .................................................. H05B 6/10
[52] U.S. Cl. .......................... 219/633; 219/634; 219/671; 219/674; 219/676
[58] Field of Search .................................. 219/633, 607, 219/611, 672, 674, 676, 671, 634, 662

[56] References Cited

U.S. PATENT DOCUMENTS

| | | |
|---|---|---|
| 2,052,010 | 8/1936 | Bailey . |
| 2,452,801 | 11/1948 | Storm . |
| 2,620,433 | 12/1952 | Denneen et al. . |
| 2,739,829 | 3/1956 | Pedlow et al. ............... 219/633 |
| 3,062,940 | 11/1962 | Bauer et al. ............... 219/633 |
| 3,238,346 | 3/1966 | Savko . |
| 3,472,987 | 10/1969 | Viart . |
| 3,688,233 | 8/1972 | Moore et al. . |
| 3,688,236 | 8/1972 | Boaz et al. . |
| 3,725,630 | 4/1973 | Gagliardi . |
| 3,755,644 | 8/1973 | Lewis . |
| 4,010,536 | 3/1977 | Fujita et al. . |
| 4,048,458 | 9/1977 | Zirk, Sr. . |
| 4,145,591 | 3/1979 | Takeda . |
| 4,256,945 | 3/1981 | Carter et al. . |
| 4,259,654 | 3/1981 | Persson et al. . |
| 4,388,510 | 6/1983 | Hughes . |
| 4,402,309 | 9/1983 | Harrison . |
| 4,442,331 | 4/1984 | Watanabe . |
| 4,546,210 | 10/1985 | Akiba et al. . |
| 4,629,844 | 12/1986 | Griffith et al. . |
| 4,695,712 | 9/1987 | Busch . |
| 4,745,264 | 5/1988 | Carter . |
| 4,778,971 | 10/1988 | Sakimoto et al. . |
| 4,914,267 | 4/1990 | Derbyshire . |
| 5,101,086 | 3/1992 | Dion et al. . |
| 5,107,095 | 4/1992 | Derbyshire . |
| 5,304,767 | 4/1994 | McGaffigan et al. . |
| 5,338,920 | 8/1994 | Okusaka et al. ............... 219/611 |
| 5,349,165 | 9/1994 | Doljack . |
| 5,352,871 | 10/1994 | Ross et al. . |
| 5,378,879 | 1/1995 | Monovoukas . |
| 5,412,184 | 5/1995 | McGaffigan . |

FOREIGN PATENT DOCUMENTS

| | | |
|---|---|---|
| 750400 | 8/1933 | France . |
| 3217300 | 11/1983 | Germany . |
| 272535 | 11/1988 | Japan . |
| 8002124 | 10/1980 | WIPO . |

OTHER PUBLICATIONS

Smith, Cin et al., "Smartheat Fittings for Joining Polyethylene Gas Pipe: Tests, Field Trials and Advancements".

*Primary Examiner*—Philip H. Leung
*Attorney, Agent, or Firm*—Speckman, Pauley & Fejer

[57] ABSTRACT

A wrap tool having first and second coil regions and flange regions for inducing oscillating magnetic fields to fuse a plastic coupling having heating elements to a substrate. The first and second coil regions are wrapped around a selected plastic coupling and substrate to induce fusion currents causing melting and fusion of plastic pipes inserted into a magnetically energizable pipe coupling. The flange regions of the wrap tool are positioned adjacent each other overlappingly or inner surface to inner surface, permitting opposite current coil portions to cancel the other's magnetic fields and reduce coil inductance.

20 Claims, 6 Drawing Sheets

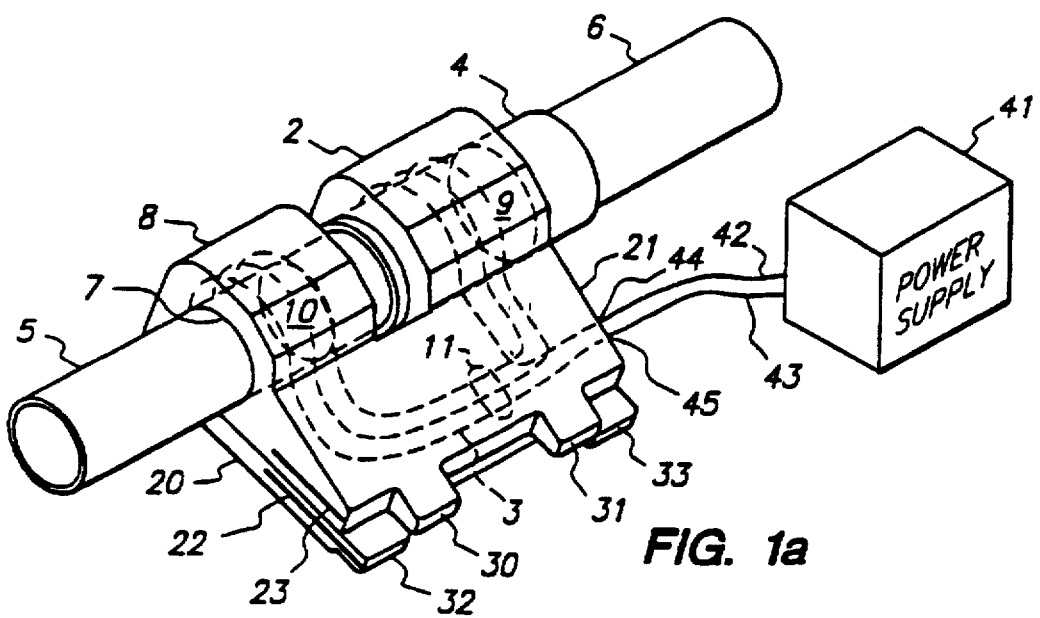
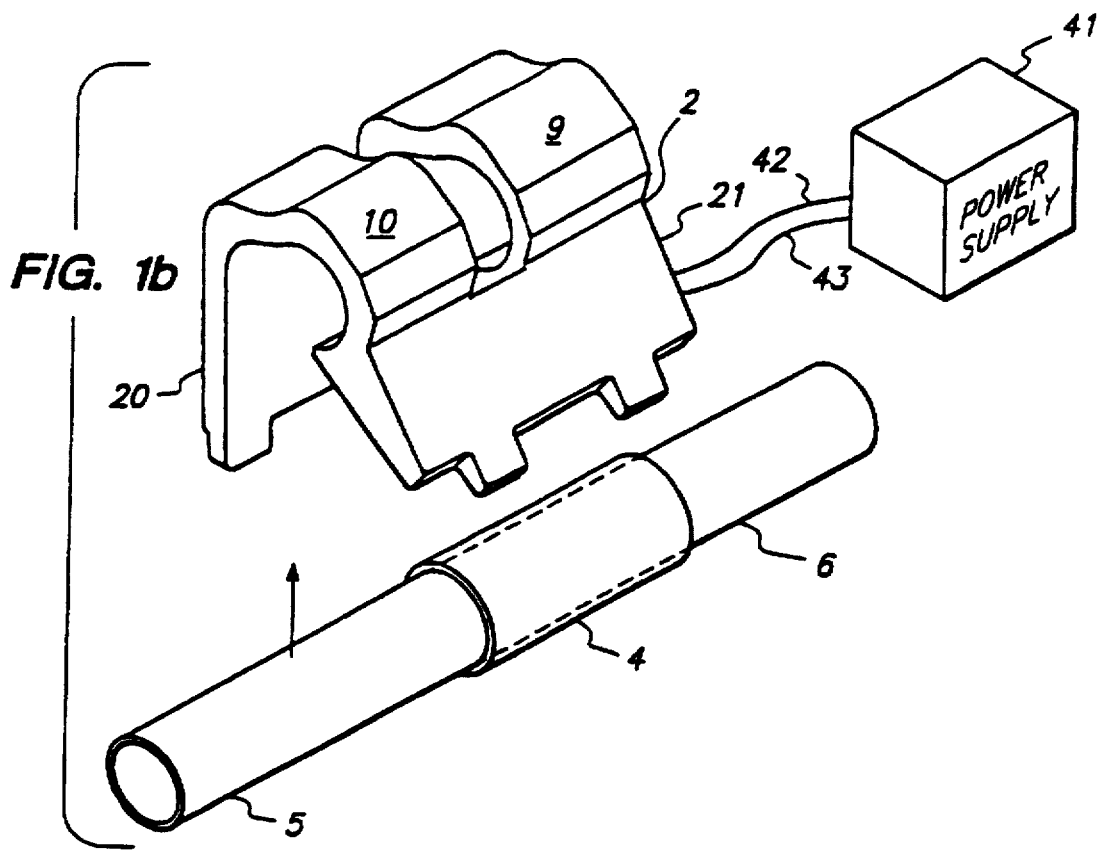

FIG. 2b  FIG. 2a

WRAP TOOL FOR MAGNETIC FIELD-RESPONSIVE HEAT-FUSIBLE PIPE COUPLINGS

BACKGROUND OF THE INVENTION

1. Field of the Invention

This invention relates to tools for coupling oscillating magnetic fields to induce selected frequency electric currents in heating elements positioned in selected regions of plastic couplings.

2. Description of Prior Art

Plastic pipes made of polyethylene or other polymers are used for many purposes, including natural gas distribution. Joining and repairing such pipes has been facilitated by the development of advanced self-regulating, constant-temperature fusion joining systems for plastic pipes. Typically, such fusion joining systems use hollow plastic couplings to join adjacent plastic pipes by fusing the ends of the pipes circumferentially to a plastic coupling. Raychem Corporation of Menlo Park, Calif., manufactures the Smart-Heat™ coupling, one type of plastic pipe coupling. General details regarding SmartHeat™ couplings and their operation are provided in U.S. Pat. No. 4,256,945 (1981) entitled "Alternating Current Electrically Resistive Heating Element Having Intrinsic Temperature Control," which is incorporated by reference into this application.

Such a pipe coupling has magnetic field responsive heating elements at least partially embedded in the cylindrical walls of the coupling. Typically, the pipe coupling is used to fuse two pipes together. The end portions of two plastic pipes are inserted into the pipe coupling, and an external tool applies a suitable frequency, time-varying magnetic field to induce electric currents in the heating elements. The heating elements become sufficiently hot to melt adjacent portions of the plastic pipe coupling material and fuse the pipe coupling circumferentially to the end portions of the pipes.

The heating elements in the pipe coupling can self-regulate and can include solid wires which have an electrically conductive non-magnetic core which has a low resistance. Copper is one example of such a non-magnetic core. The heating elements generally have a more highly electrically resistant outer perimeter of one or more magnetic materials which surround the copper core. In lieu of wires, the heating element can include loaded materials for induction heating, as disclosed in U.S. Pat. No. 5,378,879, which is incorporated by reference into this application.

Due to a skin effect at the operational frequency of the pipe coupling, electric current is confined to the heating element surfaces, which are more highly electrically resistive than the inner core of the heating element. The relatively high electrical resistance of the magnetic outer layer of the heating element causes an increase in the temperature of such layer. After reaching a certain temperature, the magnetic properties of the outer layer change. Such change substantially reduces the flow of electric current through the outer layer. The current then begins to flow increasingly through the relatively highly conductive inner core of the heating element. Due to the reduced electric current, the temperature of the outer layer is reduced, and after dropping to a certain lower temperature, again begins to conduct electricity. Such increase in conduction again increases the temperature of the wire. Thus, a heating element in a pipe coupling can self-regulate about a particular temperature.

However, heating elements can be nonregulating as well. Whether regulating or nonregulating, the heating element becomes sufficiently hot to melt the interior surface of the pipe coupling and an abutting pipe surface, causing fusion between the plastic pipe and the pipe coupling. The self-regulating feature of the coupling controls and regulates fusion while preventing damage to the plastic pipe and coupling.

Regardless of whether a pipe coupling is self-regulating, the fusion process is tolerant of some misalignment between the pipe and coupling being joined. Further, the end portions of two pipes being joined by a coupling need not abut one another because the pipe coupling can bridge a gap between such pipes.

An external tool which surrounds applicable parts of the coupling and provides a controllable source of selected frequency magnetic fields induces electric currents in the heating elements. Unfortunately, because of variations in magnetic field in the coupling, distribution of heat within pipe couplings can be somewhat irregular, which can result in damage and imperfections in the pipe fusion joint. As a result, repairs to the damaged pieces of piping have to be made at considerable expense and inconvenience.

SUMMARY OF THE INVENTION

It is one object of this invention to achieve a wrap tool that provides adequately strong, uniformly distributed oscillating magnetic fields efficiently with minimal power losses to a pipe coupling having heating elements responsive to induced oscillating magnetic fields. The uniform distribution of oscillating magnetic fields according to this invention ensures uniform heating of the coupling heating elements.

It is another object of this invention to provide a wrap tool which minimizes oscillating magnetic fields in areas away from coupling heating locations to minimize power losses during operation, to reduce possible harmful effects to humans, and to meet regulatory and legal requirements.

These and other objects are achieved with a wrap tool, according to one preferred embodiment of this invention, which has separate working and return coils at least partially positioned about a pipe coupling having magnetically-coupled heating elements. The wrap tool produces uniformly oscillating magnetic fields and consequent regularity in heat distribution for fusion of the pipe coupling to inserted plastic pipes. The uniformly oscillating magnetic fields induce correspondingly uniformly oscillating electric currents within the heating elements of the pipe coupling, producing a uniform heat distribution within the pipe coupling.

According to one preferred embodiment of this invention, the wrap tool has an electric winding including working and return coils which are axially separated with respect to each other and are interlinked in flanges of a flexible sleeve harness. The flexible sleeve harness holds the wires of the working and return coils in spaced relationship to each other and is at least partially positioned about the circumference of a substantially cylindrical plastic pipe coupling. The flanges of the wrap tool can be separated to permit installation of the wrap tool about the pipe coupling and plastic pipes for fusion joinder with oscillating magnetic fields.

According to another preferred embodiment of this invention, the return coil serves as a second working coil. A first working coil is positioned about the external surface of one portion of a coupling, and a second working coil is positioned about the external surface of another portion of the coupling.

Throughout the specification and claims, where the wrap tool is described as having a working coil and a return coil, it is understood that the return coil can serve as a working coil which induces electric current in a heating element.

The wrap tool can include a unitary, flexible sleeve wire harness having extension flanges of a suitable flexible material such as urethane or another elastomeric, electrically insulative material, to enable convenient installation by permitting the flanges to be separated to allow them to be pulled over the plastic coupling.

The flanges contain wire links interconnecting corresponding wire turns of the working and return coils, which are axially spaced apart with respect to each other in the sleeve harness. One flange contains the wire links carrying electric current from the working coil to the return coil, and the other flange contains corresponding wire links carrying electric currents from the return coil to the working coil. The working coil induces electric currents in the heating elements of the plastic pipe coupling, and the return coil provides circuit completion.

The flanges are physically coupled with respect to each other after being wrapped about a pipe coupling. A power supply is then energized to provide the needed drive currents at the appropriate operational frequency to heat and fuse the pipe coupling to the pipes. The corresponding, oppositely directed electric currents in the wire links of the adjacent flanges of the working and return coils produce bucking magnetic fields which cancel each other during operation.

As a result of the cancellation of the magnetic fields in adjacent wires of the electric winding in the flange regions, the combined electrical impedance of the induction winding including return and working coils is decreased, reducing operational voltages in the wrap tool. The flange regions can be planar or curved. According to one preferred embodiment of this invention, the coil wires in the flange regions are supported by first and second correspondingly contoured rigid boards of polycarbonate or selected laminates, for example.

According to another preferred embodiment of this invention, a suitable capacitor, or distributed capacitors connected in series with the inductive working and return coils, are provided for connection with a source of suitable frequency alternating electric power. The distribution of capacitors can be within a combined winding which includes working and return coil segments and the electric links therebetween.

BRIEF DESCRIPTION OF THE DRAWINGS

FIG. 1a is a perspective view of a wrap tool according to one preferred embodiment of this invention, mounted on a plastic pipe coupling joining a first plastic pipe and a second plastic pipe;

FIG. 1b is a perspective view of the wrap tool according to one preferred embodiment of this invention, with the flanges of the wrap tool in an open state;

FIG. 2a is a side schematic view showing the general winding scheme of the working coil and return coil and the connecting wires between corresponding wire turns in the working coil and return coil, which are embedded in the inner surface of the flanges of the wrap tool, according to one preferred embodiment of this invention;

FIG. 2b is a side schematic view of the working coil and the return coil and connecting wires in the flanges of the wrap tool according to one preferred embodiment of this invention, particularly showing first corresponding wire layer and second corresponding wire layer carrying oppositely directed electric currents to establish power saving bucking magnetic fields in the connecting wires interconnecting the working coil and return coil;

DESCRIPTION OF PREFERRED EMBODIMENTS

Figure 1C:
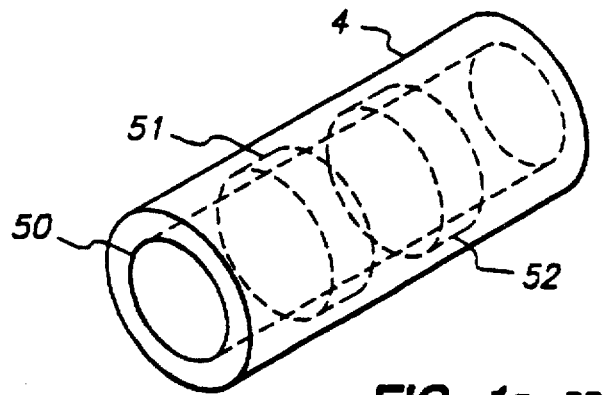
FIG. 1c is a perspective view of a prior art pipe coupling having first and second embedded magnetic induction heaters for enabling the pipe coupling to be controllably fused to first and second insertable plastic pipe ends.

FIG. 1a shows a perspective view of a wrap tool 2 according to one preferred embodiment of this invention, including an electric winding 3 installed about a plastic pipe coupling 4 into which the ends of first plastic pipe 5 and second plastic pipe 6 are positioned. Wrap tool 2 includes a flexible sleeve harness including inner surface 7 and outer surface 8. Electric winding 3 includes working coil 9 and return coil 10 and electric links 11 connecting segments of working coil 9 and return coil 10 to each other electrically. Wrap tool 2 further includes first flange 20 and second flange 21 for securing corresponding individual electric links 11 in a magnetically opposing configuration.

According to one preferred embodiment of this invention, as shown in FIGS. 1a, 1b, 2a, 2b and 2c, first flange 20 and second flange 21 extend substantially tangentially outward from the circumference of wrap tool 2. A tangential direction from the circumference of wrap tool 2 is defined as any plane tangential to a cylinder concentric with the axis of wrap tool 2. Such tangentially extending first flange 20 and second flange 21 are beneficial for installing wrap tool 2 around pipes located near flat surfaces, because the cylindrical body of wrap tool 2 is essentially an extension of one of first flange 20 or second flange 21, which can easily be stopped under a selected pipe adjacent the flat surface. According to another preferred embodiment of this invention, first flange 20 and second flange-21 extend radially outward from the center of wrap tool 2. Wrap tool 2 includes a sleeve harness of a flexible elastomeric material such as urethane, for example. Rigid board 22 is preferably embedded in first flange 20 and rigid board 23 is preferably embedded in second flange 21 to provide support and ease of manual handling during installation and removal of wrap tool 2 with respect to pipe coupling 4 and plastic pipes 5 and 6. This is particularly useful after pipes 5 and 6 have been inserted into pipe coupling 4, and it is no longer possible to slip wrap tool 2 over an end of pipe coupling 4. During fusion operation, first flange 20 and second flange 21 are matingly coupled with one flange inner surface engaging the other flange inner surface, or by wrapping one flange under the other flange, according to another preferred embodiment of this invention. In such embodiment, the inner surface of one flange is coupled to the outer surface of the other flange during fusion operation. First flange 20 and second flange 21 are engageable in flat, curved, and overlapped versions, according to this invention.

Installation of wrap tool 2 shown in FIG. 1a requires separating first flange 20 and second flange 21 and pulling first flange 20 and second flange 21 transversely over pipe coupling 4, and then securing first flange 20 and 25 second flange 21 with respect to each other. According to one preferred embodiment of this invention, flange 22 includes tabs 30, 31 and flange 23 includes tabs 32, 33. To manually remove wrap tool 2 from pipe coupling 4, an operator grasps and pulls one or more of tabs 30, 31, 32, 33 on one flange to separate such flange from the other flange. According to one preferred embodiment of this invention, tabs 30, 31 are offset from respective tabs 32, 33 to permit an operator's adjacent fingers to bear against neighboring offset tabs.

FIG. 1a further shows electric winding 3 embedded within wrap tool 2 at or near the inner surface 7 of wrap 10 tool 2. Actual embedding is not essential, but electric winding 3 is preferably secured at or near selected surfaces of wrap tool 2. An adhesive can be used to secure electric winding 3 with respect to wrap tool 2. Electric winding 3 is provided with electricity at selected high frequency power levels from a power source 41 which is connected through first electric current path 42 and second electric current path 43, one of which paths may include a ground or a common connection.

According to one preferred embodiment of this invention, electric winding 3 is constructed of Litz wire, which is a known multistrand twisted configuration of fine wires, for example, insulated copper or silver wire. Such wire reduces resistance losses during operation, particularly resistance losses at 400 kilohertz, the preferred operational frequency of the SmartHeat™ coupling. Litz wire is particularly flexible and convenient for ease of manufacture. It is apparent that electric winding 3 can comprise other types of wires known to those skilled in the art which are suitable for the intended purpose of generating oscillating magnetic fields.

As shown in FIG. 1a, both path 42 and path 43 are electric lines. Electric winding 3 has first end 44 and second end 45 which are connected to first electric current path 42 and second electric current path 43, respectively. Electric winding 3 includes a selected plurality of turns in its progress to and from current paths 42 and 43. A single turn of electric winding 3 begins by traversing working coil 9, first flange 20, return coil 10, and second flange 21, where the turn is connected to a next turn of electric winding 3 for a repeat of the same traversal pattern. Each turn follows the same general contour of inner surface 7 of wrap tool 2. Electric winding 3 includes a predetermined plurality of turns.

According to one preferred embodiment of this invention, an axial spacing between adjacent turns of return coil 10 of wrap tool 2 is less than the axial spacing between adjacent turns in the working coil 9. Such reduced spatial separation induces more intense magnetic fields in return coil 10, but as there are preferably no heating elements within the circumference of return coil 10 according to such preferred embodiment, no undesired heat is produced. The spacing between adjacent turns in working coil 9 is selected to produce a level of alternating magnetic power which induces desired electric current levels in heating elements within pipe coupling 4. Where return coil 10 serves as a second working coil, the axial spacing between adjacent turns in the second working coil can be the same or different from the axial spacing between adjacent turns in working coil 9.

FIG. 1b is a perspective view of wrap tool 2 according to one preferred embodiment of this invention, in an open state before or after mounting on pipe coupling 4. Such open state permits positioning wrap tool 2 about a selected end of pipes 5 or 6. The tangential extension of first flange 20 and second flange 21 from wrap tool 2 permits positioning wrap tool 2 about pipes 5, 6 and pipe coupling 4 even when pipes 5, 6 are very close to a wall or other surface or obstruction.

FIG. 1c is a perspective view of a prior art pipe coupling 4 having an inner surface 50 in which are embedded magnetically activable heaters 51 and 52 for enabling pipe coupling 4 to be controllably fused to selected plastic pipe ends (not shown).

FIG. 2a is a side schematic view of working coil 9 and return coil 10 and first electric links 9' in first flange 20 and second electric links 10' in second flange 21 of wrap tool 2, according to one preferred embodiment of this invention. Further shown are ends 44 and 45 which connect working coil 9 through respective paths 42 and 43 to power supply 41 to produce an oscillating electric current in electric winding 3 which induces magnetic fields in the regions around the wires of working coil 9. FIG. 2b is another side view of working coil 9 and return coil 10, and first electric links 9' in first flange 20 and second electric links 10' in second flange 21 of wrap tool 2 according to this invention. Particularly shown are first electric links 9' and second electric links 10' between working coil 9 and return coil 10.

Figure 2C:
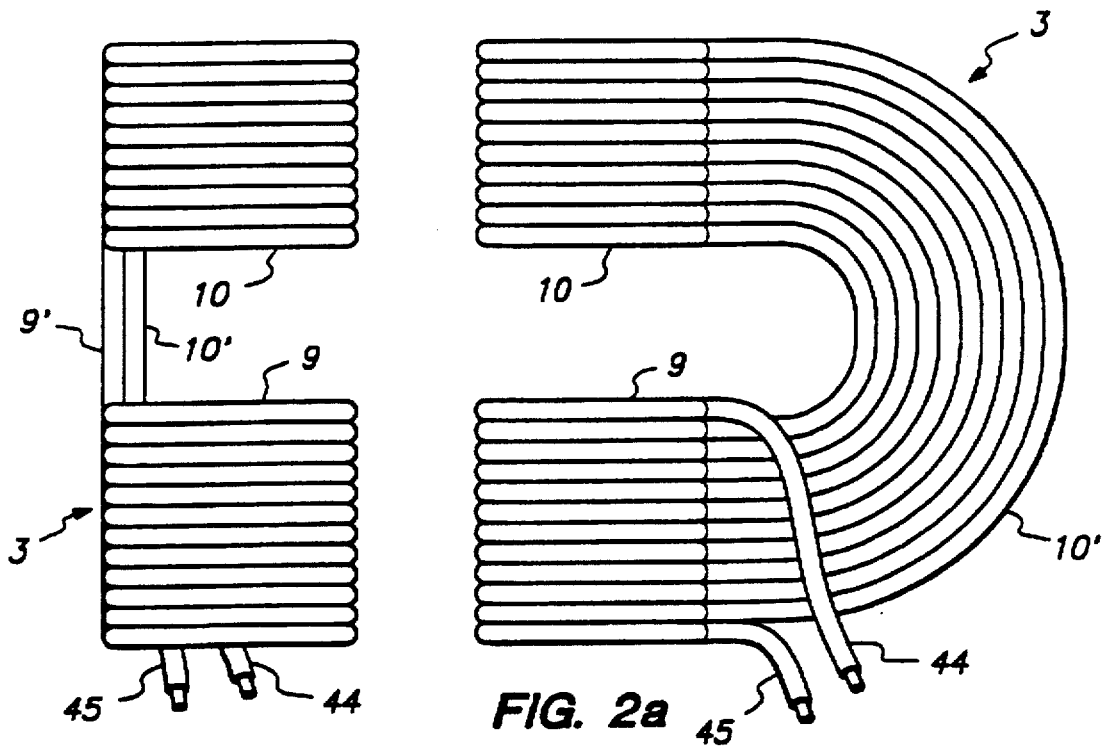
FIG. 2c is an end schematic view of the working coil and return coil and connecting wires in the flanges of the wrap tool according to one preferred embodiment of this invention.
Figure 2C:
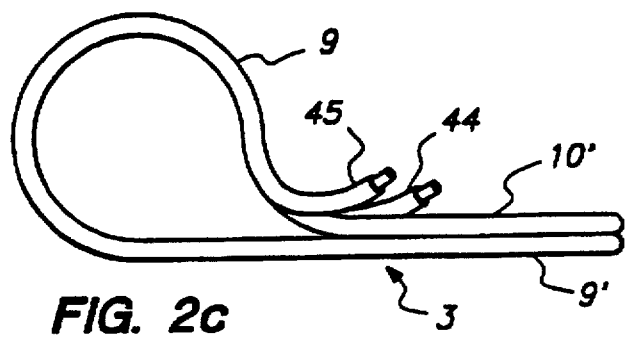

FIG. 2c is an end view of working coil 9 and return coil 10 and first electric links 9' in first flange 20 and second electric links 10' in second flange 21 of the wrap tool 2 according to this invention. Further shown are wire ends 44 and 45 which connect working coil 9 through respective paths 42 and 43 to power supply 41 which produces a varying electric current in electric winding 3 which induces magnetic fields in the regions around the wires of working coil 9. Particularly shown are first electric links 9' and second electric links 10' between working coil 9 and return coil 10.

First flange 20 and second flange 21 can be perpendicular to or tangential to a circumference of wrap tool 2. According to one preferred embodiment of this invention, the inner surface of first flange 20 is engageable with the inner surface of second flange 21. First electric links 9' and second electric links 10' are secured with the engaging surfaces of first flange 20 and second flange 21. Upon engagement between first flange 20 and second flange 21, the magnetic fields of first electric links 9' and second electric links 10' are each cancelled by the other.

Figure 6:
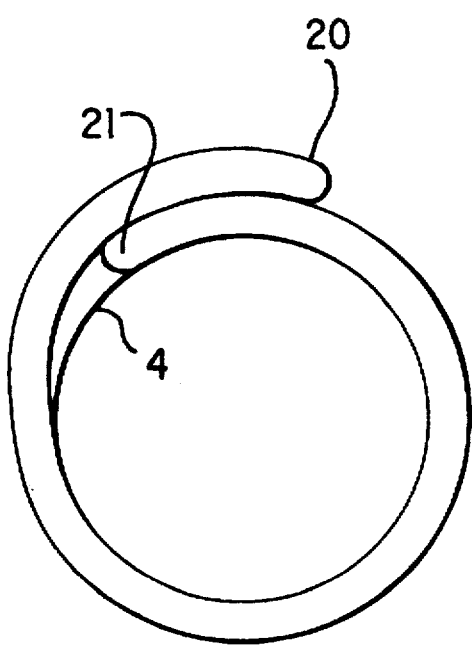
FIG. 6 is a schematic view of a wrap tool, according to another preferred embodiment of this invention.

FIG. 6 is a schematic view of wrap tool 2 according to another preferred embodiment of this invention. In such preferred embodiment, inner and outer surfaces of first flange 20 and second flange 21 can overlap each other in engagement. Second flange 21 can have radial projections which mate with openings in first flange 20 to secure second flange 21 with respect to first flange 20 during the heating process.

Figure 3A:
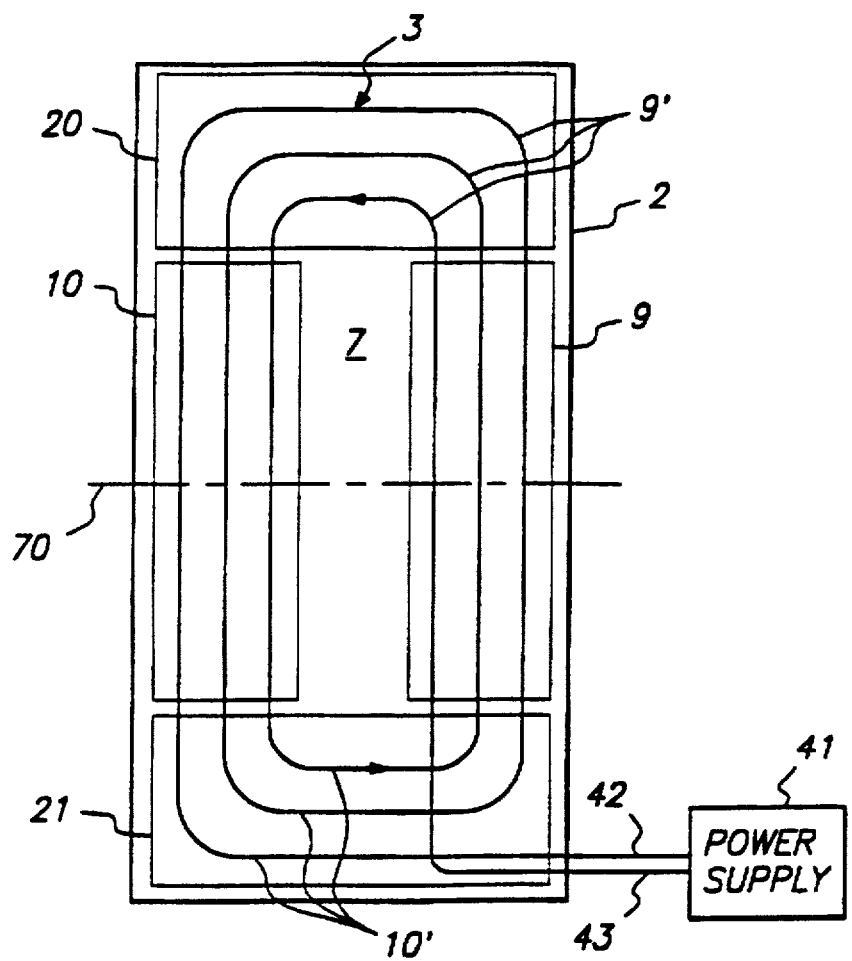
FIG. 3a is a schematic view of the working coil and return coil and their interconnections according to the present invention, projected on an inner surface of the wrap tool.

FIG. 3a is a flat projection of the region of inner surface 7 of wrap tool 2 according to one preferred embodiment of this invention. FIG. 3a shows an unwrapped version of the coil distribution pattern of electric winding 3 secured with respect to inner surface 7 of wrap tool 2. Central dotted line 70 represents the zenith of inner surface 7 of wrap tool 2. This is the location at which a turn of electric winding 3 is half-way through working coil 9 or half-way through return coil 10. Also shown are first flange 20 and second flange 21, through which electric winding 3 passes to traverse between working coil 9 and return coil 10. First flange 20 and second flange 21 respectively include first electric links 9' and second electric links 10'.

Figure 3B:
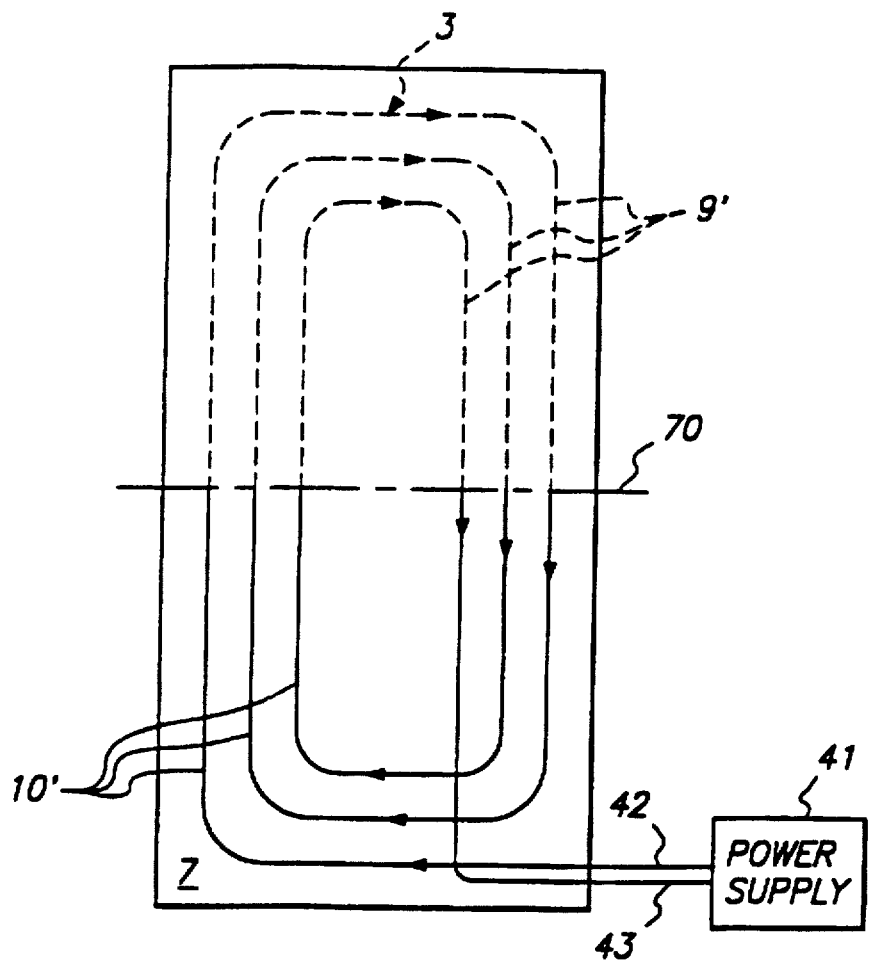
FIG. 3b is a modification of the schematic view of FIG. 3a which shows in dashed lines the portion of the working coil and return coil and connecting wires between the working coil and the return coil of the wrap tool.

FIG. 3b is a modification of the flat projection of FIG. 3a showing in dashed lines the portion of electric winding 3 of wrap tool 2 which is wrapped onto the backside of pipe coupling 4 which is fused to selected pipes 5, 6, according to this invention. The dashed lines indicate that the far side of electric winding 3 in inner surface 7 is being illustrated above dotted line 70, and the dark lines of FIG. 3b emphasize that the near side of electric winding 3 in inner surface 7 is being shown below dotted line 70.

Figure 3C:
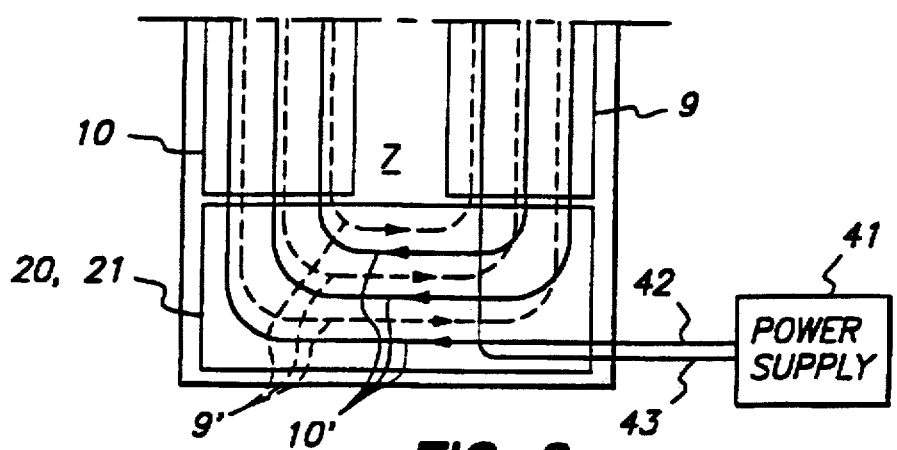
FIG. 3c is a conceptual illustration of the wrap tool coils and connecting wires according to FIG. 3b according to one preferred embodiment of this invention, showing in phantom the portions of the coils and connecting wires which are on the backside of the pipe coupling at installation, and showing the bucking current flows which result in a cancellation of magnetic fields in the vicinity of the flanges which contain the corresponding connecting wires.

FIG. 3c is a conceptual illustration of a wrapped version of electric winding 3 and inner surface 7 showing in phantom first electric links 9' of electric winding 3 which is on the backside of pipe coupling 4, according to one preferred embodiment of this invention. FIG. 3c additionally shows the adjacency of corresponding first electric links 9' and second electric links 10' of electric winding 3 in flanges 20 and 21 which results in the beneficial cancellation of magnetic fields called bucking. Bucking occurs because the alternating currents in first flange 20 and second flange 21 are oppositely directed. Bucking is accomplished with precision according to the present invention, by producing the bucking field with a continuation of the same wire, on a wire by wire basis, which produced the magnetic field being cancelled. The opposite currents of dark and dashed coil lines in working coil 9 and return coil 10 respectively do not cancel, because the dark and dashed coil lines are separated by pipe coupling 4 (not shown).

Figure 4:
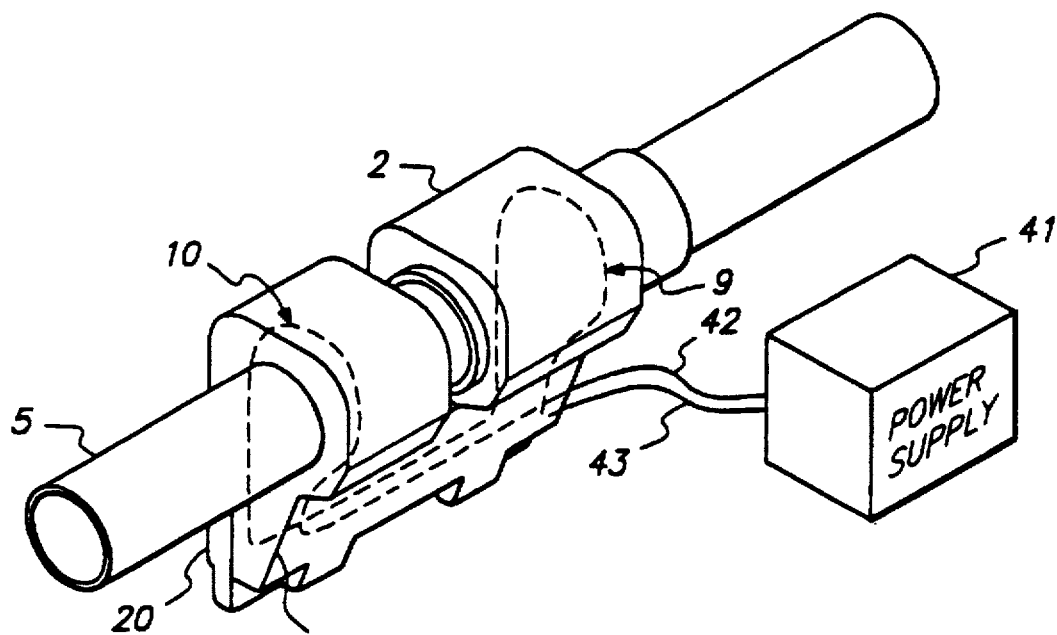
FIG. 4 is a perspective view of the wrap tool according to one preferred embodiment of this invention, installed on a selected pipe coupling, showing a single turn of the wrap tool following a path through the working coil and return coil with oppositely directed adjacent alternating currents in the flanges of the wrap tool that cancel opposing magnetic fields.

FIG. 4 is a perspective view of wrap tool 2 showing a single turn of electric winding 3 connected to power supply 41 and following a selected path of the turn through working coil 9 and return coil 10. The path of the turn includes first flange 20 and second flange 21 having respective differently directed alternating currents which cancel each other out to minimize tool external magnetic fields in the flange regions of wrap tool 2.

Figure 5A:
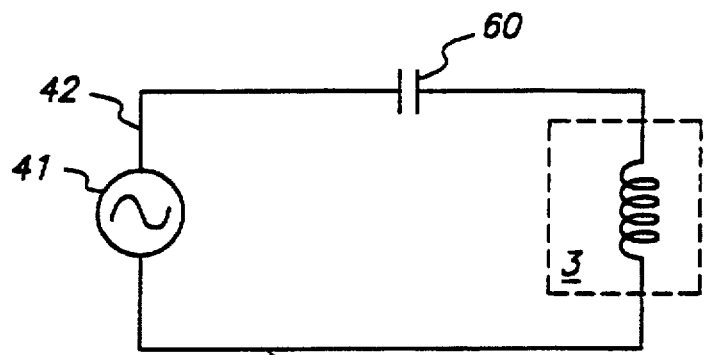
FIG. 5a is a diagram of the electric circuitry of one preferred embodiment of this invention, including a capacitor for reducing the voltage requirements of the wrap tool during fusion operation.

FIG. 5a is a diagram of electric winding 3 according to one preferred embodiment of this invention including a capacitor 60, for minimizing the peak voltage produced by power supply 41. Capacitor 60 is shown connected to power source 41 through paths 42 and 43 and electric winding 3. The selection of the precise capacitance required depends on the inductance of working coil 9 and return coil 10. Optimally, capacitor 60 is selected to establish a resonance condition at the operational frequency intended for electric winding 3 to accomplish fusion operation. The embodiment shown in FIG. 5a relies upon a lumped single capacitor 60. According to another preferred embodiment of this invention, the capacitance represented by capacitor 60 is distributed within working coil 9. According to yet another preferred embodiment of this invention, a selected number of capacitances can be placed at two or more locations of working coil 9 and/or return coil 10. Preferably, the wire-to-wire spacing of electric winding portions is kept to a minimum between first flange 20 and second flange 21 to reduce inductance for flat, curved, and overlapped versions of flanges 20, 21.

Figure 5B:
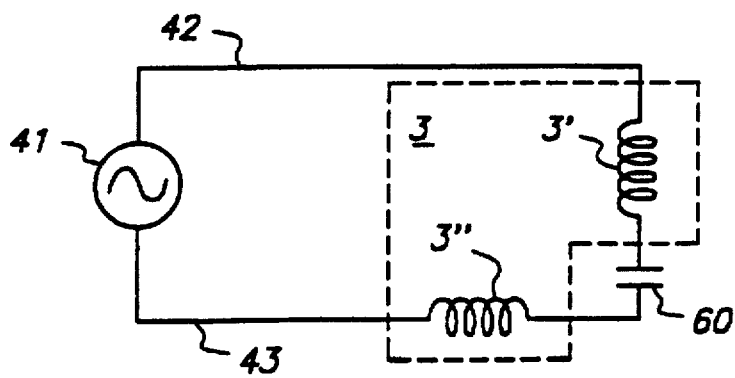
FIG. 5b is a diagram of the electric circuitry of another preferred embodiment of this invention, which includes a split winding straddling a capacitor for minimizing peak voltages in the wrap tool during fusion operation.

FIG. 5b is a diagram of a split coil version of one preferred embodiment of this invention in which electric winding 3 includes first coil winding portion 3' and second coil winding portion 3" which are each connected to capacitor 60. Capacitor 60 can be connected substantially halfway along the length of electric winding 3, and can be fabricated in a selected one of first flange 20 or second flange 21 (not shown).

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A wrap tool for inducing an electric current in a heating element, comprising:
   a sleeve having a first sleeve portion, a second sleeve portion spaced from the first sleeve portion, a first flange secured with respect to the first sleeve portion and the second sleeve portion, and a second flange secured with respect to the first sleeve portion and the second sleeve portion;
   an electric winding having
   (a) a first coil secured with respect to the first sleeve portion including a plurality of first wire turns,
   (b) a second coil secured with respect to the second sleeve portion including a plurality of second wire turns,
   (c) the first coil electrically coupled to the second coil by a plurality of first electrical conductors directing in a first direction an oscillating electric current generating oscillating magnetic fields, the first coil electrically coupled to the second coil by a plurality of second electrical conductors positioned with respect to the first plurality of electrical conductors and directing the oscillating electric current in a second direction that generally cancels the oscillating magnetic fields of the first electrical conductors, and
   (d) a series capacitor electrically connected between the first coil and the second coil; and
   the first electrical conductors secured with respect to one of the first flange and the second flange.

2. The wrap tool according to claim 1 wherein an interior surface of at least one of the first flange and the second flange is curved.

3. The wrap tool according to claim 1 wherein an interior surface of at least one of the first flange and the second flange is planar.

4. The wrap tool according to claim 1 wherein a first interior generally planar surface of the first flange and a second interior generally planar surface of the second flange are generally parallel to a plane tangential to an inner circumference of an installed said wrap tool.

5. The wrap tool according to claim 1 wherein a first interior surface of the first flange and a second interior surface of the second flange are perpendicular to a plane tangential to an inner circumference of an installed said wrap tool.

6. The wrap tool according to claim 1 wherein the first wire turns are at least partially embedded within the first sleeve portion and the second wire turns are at least partially embedded within the second sleeve portion.

7. The wrap tool according to claim 1 wherein a series capacitor has a capacitance value that enables resonance of the first coil and the second coil at a particular frequency.

8. The wrap tool according to claim 1 wherein the electric winding comprises a first winding part and a second winding part and a capacitor electrically connected between the first winding part and the second winding part.

9. The wrap tool according to claim 1 comprising a plurality of series capacitors each respectively electrically connected between selected individual corresponding said first wire turns of the first coil and selected individual corresponding said second wire turns of the second coil.

10. The wrap tool of claim 1 wherein series capacitances are distributed in the electric winding.

11. The wrap tool according to claim 1 wherein the sleeve is of a unitary construction.

12. The wrap tool according to claim 1 wherein the first flange has an inner surface that is mateable with an outer surface of the second flange.

13. A wrap tool system for inducing oscillating magnetic fields to fuse a plastic coupling having at least one magnetic-field-responsive heating element to a substrate, said wrap tool including:

(a) an electric winding comprising a first coil including a plurality of first wire turns for carrying oscillating electric currents applying correspondingly oscillating magnetic fields to said at least one magnetic-field-responsive heating element associated with said plastic coupling, a second coil including a plurality of second wire turns corresponding respectively to the wire turns of said plurality of first wire turns, and a plurality of first electrical conductors and a plurality of second electrical conductors respectively associated with said second coil and said first coil, corresponding individual said first wire turns and said second wire turns being interconnected by a corresponding electrical conductor of said first electrical conductors and said second electrical conductors;

(b) a flexible sleeve having a first sleeve portion, a second sleeve portion spaced from the first sleeve portion, a first flange secured with respect to the first and second sleeve portions, and a second flange secured with respect to the first and second sleeve portions said flexible sleeve being cooperably engageable at said first flange and said second flange for circumferential engagement with corresponding individual conductors of said first electrical conductors and said second electrical conductors around said at least one magnetic-field-responsive heating element; and (c) a source of oscillating power connected to said electric winding for providing electric power to said electric winding at a frequency effective for inducing heat in said at least one magnetic-field-responsive heating element associated with said plastic coupling.

14. A wrap tool for inducing an electric current in a heating element, comprising:

a flexible sleeve having a first sleeve portion, a second sleeve portion spaced from the first sleeve portion, a first flange secured with respect to the first sleeve portion and the second sleeve portion, and a second flange secured with respect to the first sleeve portion and the second sleeve portion;

an electric winding having
(a) a first coil secured with respect to the first sleeve portion including a plurality of first wire turns,
(b) a second coil secured with respect to the second sleeve portion including a plurality of second wire turns,
(c) the first coil electrically coupled to the second coil by a plurality of first electrical conductors directing in a first direction an oscillating electric current generating oscillating magnetic fields, the first coil electrically coupled to the second coil by a plurality of second electrical conductors positioned with respect to the first plurality of electrical conductors and directing the oscillating electric current in a second direction that generally cancels the oscillating magnetic fields of the first electrical conductors; and the first electrical conductors secured with respect to one of the first flange and the second flange.

15. The wrap tool according to claim 14 wherein the flexible sleeve comprises elastomeric, electrically insulating material.

16. The wrap tool according to claim 14 wherein an interior surface of at least one of the first flange and the second flange is curved.

17. The wrap tool according to claim 14 wherein an interior surface of at least one of the first flange and the second flange is planar.

18. The wrap tool according to claim 14 wherein a first interior generally planar surface of the first flange and a second interior generally planar surface of the second flange are generally parallel to a plane tangential to an inner circumference of an installed said wrap tool.

19. The wrap tool according to claim 14 wherein a first interior surface of the first flange and a second interior surface of the second flange are perpendicular to a plane tangential to an inner circumference of an installed said wrap tool.

20. The wrap tool according to claim 14 wherein the first flange has an inner surface that is mateable with an outer surface of the second flange.

* * * * *